Patented Sept. 12, 1933

1,926,745

UNITED STATES PATENT OFFICE 1,926,745

PRODUCTION OF COLLOIDAL SOLUTIONS OF METAL IODIDES

Volkmar Klopfer, Dresden, Germany

No Drawing. Application May 21, 1932, Serial No. 612,872, and in Germany May 27, 1931

1 Claim. (Cl. 252—6)

Metal iodides are well known to have valuable disinfectant and therapeutic properties, but aqueous solutions thereof are not stable, and not devoid of irritant properties.

The object of my invention is to produce colloidal solutions or dispersions of metal iodides in oil, which are stable, and non-irritant, and are therapeutically highly effective.

The iodides of copper, silver and various other metals are not directly soluble in oil, but according to my invention collodial oil solutions of such iodides are produced by mixing, with a solution of iodine in oil, a chemically equivalent proportion of a metal oleate or resinate in oily solution. Reaction takes place at ordinary temperatures, a metal iodide being formed by substitution.

*Example 1.*—215 gr. of copper oleate containing 5.8% of copper are dissolved in 85 gr. of oil, e. g. olive oil or peanut oil. The solution may be filtered, for clarification thereof, but this is not always necessary. This solution is well stirred with a solution of 25 gr. iodum resublimatum in 175 gr. of olive oil or peanut oil. The reaction is completed in a short time, the oleate being decomposed, and copper iodide being formed. The solution is colloidal and stable of a malachite green color, and microscopic examination thereof reveals that the copper iodide is in a highly dispersed state.

*Example 2.*—Mercury stearate is dissolved in olive oil containing 3% of beeswax, the solution containing not more than 5% mercury. This solution is stirred with a solution of at least the equivalent proportion of iodine in olive oil or peanut oil, which preferably also contains about 3% of beeswax. The reaction is slower than in the first example, but may be accelerated by heating. It produces a collodidal solution of mercurous iodide or mercuric iodide.

*Example 3.*—Lead linoleate is dissolved in peanut oil containing 3% of beeswax, the solution containing not more than 5% of lead. The solution is stirred with a solution of at least the equivalent quantity of iodine in peanut oil containing 3% of beeswax.

The procedure described in Example 3 may be adopted also with manganese palmitinate, and the oleates of zinc, iron, and tin; also with oleates and resinates of other metals.

What I claim as my invention and desire to secure by Letters Patent of the United States is:—

The process of producing a colloidal, oily solution of a metal iodide, consisting in mixing with an oily solution of a soap of the metal a solution of iodine in oil, the iodine in the iodine solution and the metal in the soap being in such proportions that substantially the whole of the iodine is combined with the whole of the metal to produce the metal iodide.

VOLKMAR KLOPFER.